Figure 1:
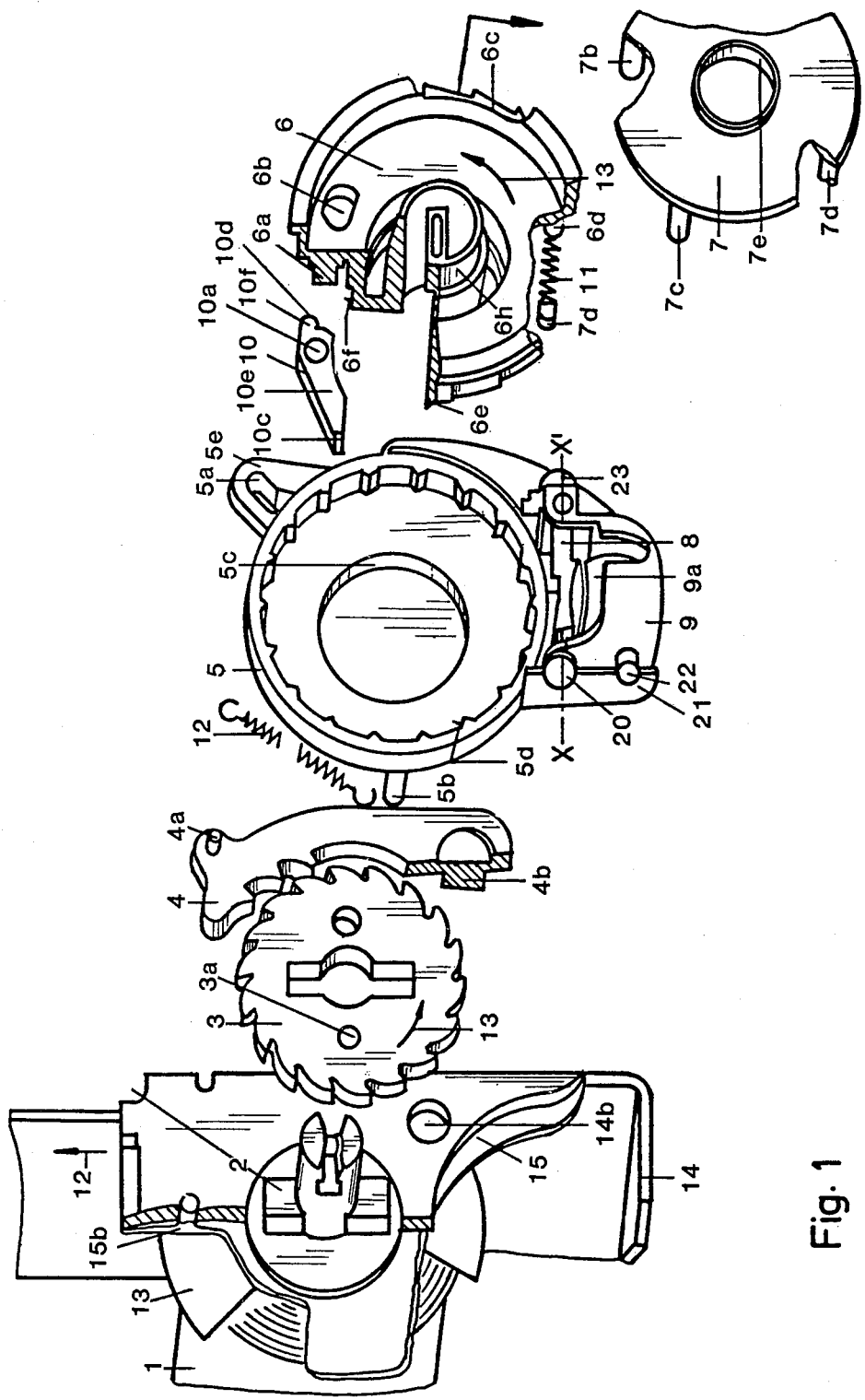

United States Patent [19]

Adomeit

[11] 4,452,405
[45] Jun. 5, 1984

[54] AUTOMATIC BELT REEL LOCK MECHANISM

[75] Inventor: Heinz D. Adomeit, Berlin, Fed. Rep. of Germany

[73] Assignee: Allied Corporation, Morris Township, Morris County, N.J.

[21] Appl. No.: 482,696

[22] Filed: Apr. 6, 1983

[30] Foreign Application Priority Data

Apr. 7, 1982 [DE] Fed. Rep. of Germany ....... 3212992

[51] Int. Cl.³ .................. A62B 35/02; B65H 75/48
[52] U.S. Cl. ................... 242/107.4 A; 242/107.4 B
[58] Field of Search ............... 242/107.4 B, 107.4 A; 280/806; 297/478, 480

[56] References Cited

U.S. PATENT DOCUMENTS

| | | | |
|---|---|---|---|
| 3,999,722 | 12/1976 | Weman et al. | 242/107.4 A |
| 4,065,069 | 12/1977 | Weman | 242/107.4 A |
| 4,065,071 | 12/1977 | Holmberg | 242/107.4 B X |
| 4,083,512 | 4/1978 | Rumpf | 242/107.4 B X |
| 4,101,092 | 7/1978 | Schmelow et al. | 242/107.4 A X |
| 4,135,682 | 1/1979 | Mizuno | 242/107.4 B |
| 4,162,773 | 7/1979 | Wallin | 242/107.4 A |
| 4,167,254 | 9/1979 | Paitula et al. | 242/107.4 A |
| 4,187,995 | 9/1980 | Rex | 242/107.4 A |
| 4,355,772 | 10/1982 | Adomeit | 242/107.4 A |

FOREIGN PATENT DOCUMENTS

| | | |
|---|---|---|
| 2429368 | 1/1975 | Fed. Rep. of Germany . |
| 1756939 | 4/1975 | Fed. Rep. of Germany . |
| 2936685 | 3/1980 | Fed. Rep. of Germany . |
| 8022462 | 3/1981 | Fed. Rep. of Germany . |
| 2217032 | 9/1974 | France . |

*Primary Examiner*—John M. Jillions
*Attorney, Agent, or Firm*—Roger H. Criss; Robert H. Johnson

[57] ABSTRACT

An automatic belt reel lock mechanism with a main housing, a reel axle with pertaining reel spring and a rolled-up belt as well as with a locking mechanism comprising a mass force sensor, a movably mounted locking pawl, a ratchet wheel and a control component which supports the mass force sensor and is mounted in the housing concentrically with the reel axle, and with a lock/drive disk concentric with the reel axle and mounted in a freely rotatable fashion in relation to it while serving the meshing of the locking pawl with the ratchet wheel through a control cam, and with a rotary inertial mass for actuating the locking pawl at excessive belt acceleration.

6 Claims, 2 Drawing Figures

AUTOMATIC BELT REEL LOCK MECHANISM

This invention concerns an automatic belt reel lock mechanism with a main housing, a reel axle with pertaining reel spring and a rolled-up belt as well as with a locking mechanism comprising a mass force sensor, a movably mounted locking pawl, a ratchet wheel and a control component which supports the mass force sensor and is mounted in the housing concentrically with the reel axle, and with a lock/drive disk concentric with the reel axle and mounted in a freely rotatable fashion in relation to it while serving the meshing of the locking pawl with the ratchet wheel through a control cam, and with a rotary inertial mass for actuating the locking pawl at excessive belt acceleration.

A lock mechanism of the above type is previously known from the international patent application WO No. 80-02823 (PCT-DE 79/00060). The housing of the vehicle-sensitive mass force sensor is there of an integral design with the lock/drive disk, and at that, through a sector which radially extends beyond the ratchet wheel and on whose end the mass force sensor is arranged while the opposite end of the protruding sector is cog-shaped and can be brought in control mesh with the free end of the pawl. The gudgeon of the prior pawl is in relation to its teeth so arranged that the pawl is in locked condition under pressure.

Besides, the locking control emanates from the side of the belt-sensitive device, that is, through the inertial mass, in case of excessive belt acceleration through a brake drum which is concentric with the reel axle and can shift the lock/drive disk through a dog, if at excessive belt acceleration a mass-affected brake shoe ensures a rotative entrainment of the brake drum.

The problem underlying the invention is the further improvement of an automatic belt reel mechanism of that type under retention of small dimensions and a further simplification of the manufacture.

This problem is inventionally solved in that the control component features in addition to the lock/drive disk with internal teeth also a control gear with external teeth which, while arranged on the reel axle, supports the lock/drive disk and comprises a pawl which is mounted in a freely rotatable fashion, in that the pivotal point of the pawl is eccentrically so arranged that a long and a short lever are being formed, and in that projections on the rotary inertial mass can be brought in mesh with the ends of the pawl. These inventional measures make it possible, independently from manufacturing tolerances, to obtain a balanced condition of the pawl in unengaged, or rest, position. To keep the over-all length of the inventional automatic locking mechanism short, the control component consists, for one, of the lock/drive disk and, for another, of the control gear which is in a parallel arrangement with it. The purpose of this design, in the event of an accident, is the rotary movement of the lock/drive disk so that the latter will through a control cam cause the locking pawl to mesh with the locking gear and stop the belt. This rotary movement of the lock/drive disk is accomplished through two control devices, one being the vehicle-sensitive mass force sensor featuring in other prior devices mostly a ball or similar which is arranged underneath a sensor pawl, so that when the sensor pawl has pivoted up the lock/drive disk will receive the angular momentum from the control gear turning with the reel axle. The belt-sensitive mass, on the other hand, is a disk or plate-shaped fly mass which through the mentioned projections, the pawl which within certain and yet to described limits is freely rotable, and through the internal teeth of the lock/drive disk imparts as well an angular momentum to the latter.

It is thus perceivable why the lock/drive disk must be provided with teeth the same as the control gear and through which means the lock/drive disk, while remaining in normal condition approximately stationary, receives at undesirable accelerations the desired angular momentum. The especially unexpected is now the formation of a long and a short lever of the pawl through the respective arrangement of the pivotal point. It is a pin and/or a hole receiving a pin and inventionally arranged outside the pawl center. Due to inertial lag in the instant of accident relative to the control gear, the one fly mass projection pushes from below against the end of the long lever while at the same time the projection arranged on the end of the short lever is so disengaged that the pawl will mesh with the internal teeth of the lock/drive disk and be able to tranmit the angular momentum.

On the other hand, it can be envisaged that the pawl will in inoperative position nestle within the circumference of the control gear, permitting it to turn unimpededly relative to the lock/drive disk and the reel axle. It should be noted that the pawl is inventionally not held in this inoperative position by any spring of its own, which frequently is the case with other prior automatic lock mechanisms, but only through the two projections provided on the fly mass.

The inertial mass is suitably designed as a flywheel with pins projecting from one side. Depending on the arrangement of the flywheel before or after the control gear, of course, several pins might as well be provided projecting from one side and other pins projecting from the other side. While in another context it is already known to fashion a rotary inertial mass as a flywheel, the pins protruding from one side of the flywheel and their meshing with the pawl on the control gear constitute inventionally a particularity which permits an unexpected simplification of the manufacture because a self-adjustment of a balanced condition of the pawl is obtained independently from manufacturing tolerances, as will yet be explained in detail hereafter.

This advantage of a self-adjustment of a balanced condition of the pawl is obtained both by designing the rotary inertial mass as a flywheel according to the above features and also through a favorable further embodiment of the invention by designing the rotary inertial mass as a flat plate lying parallel with the plane of the control gear and featuring recesses whose ends are the projections for meshing with the pawl, and by placing the pawl in a recess in the same plane and mounting it rotatably the same as the inertial plate. For instance, a flywheel can be envisaged as a plate which peripherally is not round but is on two relative to the center point diametrically opposed sides flattened and peripherally interrupted through calotte-shaped, triangular, curved recesses or similar so that only the interim areas of the circumference remain on the circle. Imagining, e.g., along the circumference over an angle of about 120° to 90° an oblong curved recess extending parallel with the circumference, the pawl can, favorably when given a curved design, again be arranged nestling within the circumference of the control gear. Beginning and end of the recess can then serve as a projection in a fashion such that, as this flywheel lags relative to the control gear, the pawl will lift out and initiate the locking process. A very space-saving design is obtained by arranging the inertial plate before the disk-shaped or ring-shaped base plate of the control gear or behind it. On the side opposite the pawl, in the inertial plate recess similarly designed there, space can preferably be provided for the arrangement of a spring which at a predetermined force preloads the inertial plate relative to the control gear in a way such that the pawl will in normal condition be disengaged, i.e., remain nestled in the circumference of the control gear.

In a favorable further embodiment of the invention, a support projection for the internal ring of the lock/drive disk extending from the main plane of the control gear toward one side and, radially spaced from it, a support pin for the pivotal bore of the pawl are provided, whereas on the other side of said main plane there is a support projection for the internal ring of the flywheel arranged, and another feature is that in the peripheral direction of the control gear there are spaced holes provided for receiving flywheel pins. This enables in a particularly suitable way the arrangement of the flywheel on the one side of the control gear and of the lock/drive disk on the other side, with both disks being supported on the control gear through projections and/or shoulders. The mentioned holes in the control gear have mostly the shape of slots whose curved length extends approximately in circumferential direction. These holes enable a functional mesh on the part of the flywheel through the pawl and toward the drive disk. Already short angular movements are sufficient so that relatively short oblong holes in the control gear will do. The overall length of the automatic lock mechanism relative to the invention can obviously be held very short through the above measures. Considering that the control gear and, as the case may be, also the lock/drive disk need not absorb large forces and, consequently, may be manufactured for instance from plastic, such will explain as well the simple manufacture.

Occurring inevitably in the mass production of such automatic lock mechanisms, tolerance variations will in the production of an automatic mechanism with the measures relative to the invention not pose any difficulties, especially not when in a further embodiment of the invention the support pin on the control gear, spaced between two holes, is so arranged that two of the flywheel pins which extend through and beyond can be brought in contact with the bevels on the ends of the pawl. Between these two pins extending through the control gear, on the side facing the lock/drive disk, lies the pawl axially secured. On the proviso that the flywheel revolves with the control gear, the pawl lies within the outside diameter of the control gear which, consequently, can rotate freely relative to the lock/drive pin which is kept essentially stationary. In this normal condition the pawl is thus in a defined and only nonpositive inoperative position. This is accomplished with the simple inventional means, in other words, by permitting the two flywheel pins to rotate on a fixed circumference in the mentioned holes in the control gear and only across a certain angle, that is, to a limited extent. The end on the short lever is suitably designed as a shoulder with a bevel toward the flywheel pin in a way such that the pin will engage underneath the bevel and try to engage the pawl inwardly and/or keep it inward. Lying relative to the pivotal point of the pawl opposite, the other lever has on its end preferably also a bevel which rests on the other flywheel pin which requires that pawl end to rest on it. Recognizable now is the defined inoperative position with nonpositive locking. An absolutely stable inoperative position of the flywheel and the pawl on the control gear is surprisingly obtained in addition and independent from manufacturing tolerances, for the described components are not in a defined contact with the control gear but will always balance themselves.

In the event of a relative movement between flywheel and control gear, the flywheel pin located on the end of the longer pawl lever engages in a fashion such that the pawl will swing outward of the circumference of the control gear while on the opposite end of the short lever the pin supporting it is moving out. The pawl can at this instant transmit the angular momentum from the control gear to the lock/drive disk.

Therefore it is especially favorable, too, to inventionally arrange the internal cogs of the lock/drive disk, in assembled condition, in the engagement plane of the pawl mounted on the control gear, and the external cogs of the control gear in the engagement plane of the sensor pawl of the vehicle-sensitive mass force sensor which is rotatably mounted on the lock/drive disk. The lock/drive disk is favorably given the shape of a can, with the cylindrical walls being provided inside with the mentioned cogs which can be brought in mesh with the pawl described above in detail. In another engagement plane spaced from the one just mentioned, namely that for the vehicle-sensitive mass force sensor, there are then located the external cogs of the control gear. To enable these to mesh with the pawl of the vehicle-sensitive sensor, the latter, and specifically its rotatably mounted pawl, is arranged in this second engagement plane. This facilitates the manufacture as well and permits small overall dimensions while guaranteeing a sparing treatment of the components made from plastic.

Inventionally suitable as well is the arrangement of a lock/drive disk and control cam for receiving and guiding a control pin of the locking pawl and its design such that the control pin lies only in the unlocked condition of the locking pawl and in its near areas in an enforced-guidance contour of the control cam while the latter is in the remaining areas in no guidance engagement with the control pin, cut free, and to design the cogs of the locking pawl as well as of the locking gear self-engaging. While on the initially described automatic lock mechanism of prior type the control cam acts outwardly freely, the inventionally provided control cam is arranged within sort of an ear, enclosed on all sides, on the lock/drive disk, favorably on its outer circumference at an angular spacing from the vehicle-sensitive sensor device. Especially favorable is the design of the control cam in the described fashion. The shape of the new control cam can be envisaged as that of a banana. The invention calls for taking care that the locking pawl control pin will not be over the entire contour of the control cam constantly in flush contact so that a controlled guidance will result. For then it would be necessary to closely watch the observance of manufacturing tolerances. Owing to the inventional measures, however, the manufacturer is independent thereof, for the control cam contour is so designed that the control pin will be guided and fixed only when engaging into unlocked condition, that is, when the locking pawl is released from the locking gear. Relative to the other control cam parts which are farther away from this position, the contour is cut freely so that, for instance in case of tolerance variations in the production of the control pins, there will be no binding occur as the teeth of the locking pawl overlap those of the locking gear. Therefore, the teeth are designed in the sense of a self-threading. In other words, the lock/drive disk needs to impart to the lock pawl only a bias acceleration through the control cam and the control pin so that the teeth overlap with the lock gear will come about, whereas the entire mechanism may be left to itself thereafter. The self-threading or self-engaging of the locking pawl teeth, for one, and of the locking gear on the other hand takes place through a suitable relief of the teeth so that these will self-thread for a complete engagement. Of course, a sufficiently large overlapping between the teeth of the pawl and locking gear must be given so that, despite the freely cut areas of the control cam, the locking pawl will upon receiving the bias acceleration and/or receiving the control pulse itself take care of a complete engagement. A binding of the control mechanism is always avoided in this way. Also accomplished thereby is an outstandingly sparing treatment of the components made from more fragile or more elastic materials, for instance plastic in the case of the lock/drive disk and the control gear.

Inventionally advantageous is also the arrangement of the control pin in the area of one end of the oblong locking pawl while arranging the gudgeon of the latter in the area of its other end. In locked condition, the locking pawl is through this measure subjected to traction forces as opposed to compression forces in the prior art case described above. Additionally, it is suitable to inventionally form the locking pawl gudgeon through precision stamping. This measure permits a particularly simple manufacture. Namely, the entire locking pawl can be produced by stamping, loading for instance 4 mm plate in a precision stamping press for stamping the contour and likewise, or thereafter, forming also the gudgeon mentioned above. A suitable ram of the respective tool penetrates the material and forces the steel material in the fashion of a highly viscous liquid into a die. Despite this simple manufacturing method, the forces occurring in conjunction with this quick-action automatic locking mechanism can unexpectedly be absorbed; a gudgeon made in this way can for instance absorb forces of 1600 kp or similar. A stamped gudgeon has heretofore nowhere been used in locking mechanisms which are subjected to such high loads.

Inventionally suitable is also to make the sensor housing of the vehicle-sensitive mass force sensor at various installation angles around an axis in the plane of the lock/drive disk rotatable and adjustable relative to plumb. Envisaged on the lock/drive disk, in the lower area (in relation to plumb) can be a tongue for fastening the sensor housing. The sensor housing features in an especially suitable manner in the upper area two larger pins through which the above axis can extend, which then is arranged, e.g., perpendicularly to the swivel axis of the vehicle-sensitive sensor pawl itself. The sensor housing can be turned about this axis through the two upper swivel pins, within the tongue holding the housing, if a new adjustment or setting becomes necessary due to different installation angles. Depending on vehicle type, automatic belt mechanisms must be installed, as the case may be, at various angles to the stationary system of coordinates. Now, it is especially suitable if the sensor housing features at a distance from the one upper swivel pin a lower adjustment pin of, e.g., a smaller design. In the manufacture, this adjustment pin can be provided on the sensor housing in various positions, that is, at various angles relative to the upper swivel pin, or can be die-cast on the housing right away, facultatively while yet in the tool when producing the vehicle-sensitive mass force sensor so that, depending on the desired angle, another installation position is obtained when attaching the tongue underneath the lock/drive disk. This permits in an inexpensive and simple way various installation angles, using one and the same sensor housing and the same pawl.

Further advantages, characteristics and applications of the present invention derive from the following description of preferred embodiments in conjunction with the drawing.

Figure 2:
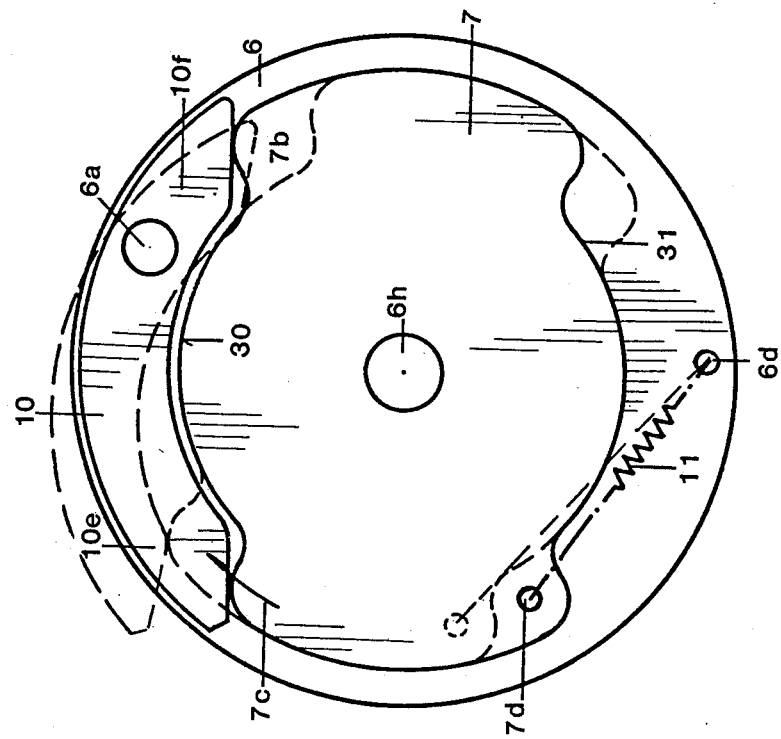

FIG. 1 shows an exploded view of the various major components in a perspective representation, and FIG. 2, a plan view of a differently designed flywheel plate with control gear and pawl.

Wound on a belt reel axle 2 on a belt reel 13 is a belt 1, and showing between the reel 13 shown in cut-away fashion and the housing 14 is an inside cover 15 on which a retention pin 15b is provided which protrudes through the wall thickness of the housing 14, to the right and forward in the drawing, and serves the attachment of the retention spring 24.

Arranged positively on the reel axle 2 mounted in the housing 14 is the locking gear 3 which features two adjustment bores 3a for receiving adjustment pins 6e of the control gear 6, which thus turns as well together with the reel axle 2. As the belt 1 is pulled out and/or unwound by the passenger so as to increase its length, the belt moves as indicated by arrow 12 and the reel axle 2 rotates in the direction of the curved arrow 13, a direction of rotation which then is observed again on the locking gear 3 and the control gear 6. Mounted in the bore 14b is the gudgeon 4b of the locking pawl 4 in a rotatable manner. Recognizable from the representation is the manufacture of the gudgeon 4b by stamping. As the locking pawl 4 pivots into the teeth of the locking gear 3, meaning when turning counterclockwise about the gudgeon, the corresponding traction force of the belt 1 is transmitted through the reel axle 2, the locking gear 3, locking pawl 4 and through its gudgeon 4b into the housing 14 which is screwed to the vehicle frame.

This rotation of the locking pawl 4 about its gudgeon 4b can be initiated and/or controlled in two ways, namely through the blocking which is produced, for one, by a vehicle-sensitive device and, for another, by a belt-sensitive device.

The vehicle sensitive device responding to the vehicle acceleration is the initially mentioned mass force sensor, namely the ball 9a mounted in movable fashion in the sensor housing 9 and lying below the vehicle-sensitive device pawl 8, illustrated here in nonoperative and/or normal condition. The sensor housing 9 is fastened on the lock/drive disk 5 and can thus be moved together with it. Manufactured generally from plastic, this lock/drive disk 5 features an inner ring 5c which bears on the support shoulder 6f of the control gear 6. This annular bottom, so to speak, is the bottom of a can on whose rim there is provided a cylindrical ring with internal teeth 5d. Fastened to the bottom of the lock/drive disk 5, a pin 5b for attachment of the retention spring 24 protrudes toward the housing 14.

Attached at an angular distance from the sensor housing 9 is an ear 5e in which a control cam 5a is fashioned.

The control cam 5a receives the control pin 4a of the locking pawl 4.

As mentioned above, the control gear 6 is mounted on the reel axle 2 so as to turn with it. Specifically two adjustment pins 6e, of which only one is shown in the drawing, provide for the connection of the control gear 6 with the locking gear 3 (through the adjustment bores 3a). Since the retention spring 24 is being held housing-fixed through the retention pin 15b mounted on the housing 14, the lock/drive disk 5 remains due to the engagement of the pin 5b with the retention spring 24 by and large stationary, that is, it can slide freely on the support shoulder 6f of the control gear 6, which is favorably made from plastic. However, a defined home position of this lock/drive disk 5 is guaranteed not only through the retention spring 24, but also through the engagement of the control pin 4a of the device pawl 4 with the control cam 5a.

The pawl 10 and the flywheel 7 not being significant to the vehicle-sensitive locking, these components will be discussed only in the next section in conjunction with the belt sensitive device.

If a vehicle acceleration occurs above the limit value of, e.g., 0.4 g, the sensor pawl 8 rises through the displacement of the ball 9a from its seat in the housing 9 and engages the teeth 6e of the control gear 6. As the reel axle continues to turn with the locking gear 3 and the control gear 6, the lock/drive disk 5 is rotatively entrained. The rotary movement of the lock/drive disk 5 results in an engagement movement of the control pin 4a of the locking pawl 4 pivoting on the gudgeon 4b, and at that, through the control cam 5a in which runs the control pin 4a of the locking pawl 4. The coordination of the teeth 6c of the control gear 6 with the position and length of the sensor pawl 8, for one, and of the control cam 5a with the geometry of the locking pawl 4, for another, is so designed that an enforced engagement will take place without any danger of tooth-on-tooth operations.

From the arrangement of the teeth of the locking gear 3 and of the locking pawl 4 it is evident that the latter is in locked condition subjected to traction. Since the control pin 4a is arranged a relatively large distance from the gudgeon 4b, a rather sensitive regulation is obtained through the control cam 5a of the lock/drive disk 5. Recognizable is the banana shape of the appropriately contoured control cam 5a. Enforced control is avoided by providing for a control pin contact with the control cam 5a for exact guidance only in the left end of the control cam as illustrated in the drawing. The contour of the control cam 5a fixes the control pin 4a by and large only in this area. Toward the top and toward the rear in the figure, however, the curve 5a is of a free design. For as the teeth of the locking pawl 4 and the locking gear 3 overlap, a self-engagement occurs during which the control pin 4a need no longer be guided in the control cam 5a and touched by it. In this latter area of movement of the locking process, the control pin 4a is practically free. In other words, the force-bearing teeth engagement between the locking pawl 4 and the locking gear 3 ensures during self-engagement that the control pin 4a remains only under the load of the retention spring 24, whereas the locking occurs certainly no more through the control cam 5a. This avoids a controlled guidance and conveys to the control pin 4a practically only a bias acceleration for initiation of the locking process. While prior mechanisms frequently involved matching problems also of components which are subject to great load, a binding of the entire control mechanism is precluded through the invention. Therefore, especially the components of the control mechanism can be manufactured from plastic.

The belt-sensitive locking takes place through the previously mentioned flywheel 7 and the components on the control gear 6 which will be discussed hereafter. From the main plane of said control gear 6 toward the left side in the figure there are mounted a support shoulder 6f for the inner ring 5c of the lock/drive disk 5 and, radially spaced from it, a support pin 6a for the bore 10a of the pawl 10. Provided on the other side of this main plane, facing toward the viewer of the figure, is the support shoulder 6h for the inner ring 7e of the flywheel 7. In addition, a slot 6b can be recognized, which is one of three oblong holes which are arranged spaced in the peripheral direction of the control gear 6. Readily envisaged in the control gear 6 quadrant cut out in the left forward position can be another oblong hole, and another oblong hole is provided in the lower area in the portion shown as well in cut-away fashion, which hole serves to receive the pin 7d for the belt-sensitive adjustment spring 11. Extending through the slot 6b is the pressure pin 7b of the flywheel 7 while the drive pin 7c of the flywheel 7 extends through the not illustrated slot in the cut-away quadrant. The section of the left upper quadrant, in plan view, lies in the center of the gudgeon 6a for the pawl 10, which extends through its bore 10a and/or into it. Recognizable as well is how the gudgeon 6a, at a distance between the right-hand slot 6b and the other slot which is to be envisaged at the left, is so arranged that the pressure pin 7b extends through the slot 6b while the drive pin 7c extends through the other oblong hole. The latter drive pin 7c, with the illustrated bevel, can bear on the left end 10c of the long lever 10e while the end of the pressure pin 7b bears on the bevel or the shoulder 10d on the end of the short lever 10f. The long lever 10e is in this embodiment four times as long as the short lever 10f of the pawl 10.

The belt-sensitive adjustment spring 11 between the pin 7d of the flywheel 7 and the retention pin 6d on the control gear 6 entrains in normal operation the flywheel 7, rotating in the direction of arrow 13. The pawl 10 nestles then in and/or within the outside diameter of the control gear 6 so that the lock/drive disk 5 is essentially stationary while the control gear 6 can move freely in relation to it. It can be recognized that the pawl 10 is not being held in the mentioned inoperative position through any spring, but only through the pressure pin 7b and the drive pin 7c of the flywheel 7. The pawl 10 lies axially secure, namely once on the rear end 10d of the short lever 10f, held by the pressure pin 7b, and on the other hand up front through the end 10c of the long lever 10e which bears on the drive pin 7c.

If a rotary acceleration of the reel axle 2 occurs in excess of an assumed limit value of, e.g., 1.5 g relative to the belt payout, the flywheel 7 will at an appropriate adjustment of the adjusting spring 11 tend to lag behind the control gear 6, due to its rotatability, that is, will rotate clockwise in the sense of the figure. In this context, the drive pin 7c on the front end 10c of the pawl 10 will pivot the pawl 10 about the bore 10a to an extent such that the pawl 10 revolving with the control gear 6 will engage the internal teeth 5d of the lock/drive disk 5. Next, the engagement process of the lock/drive disk 5 with the control cam 5a on the locking pawl 4, described above in connection with the vehicle-sensitive device, will be initated and completed similarly.

Illustrated in the embodiment relative to FIG. 1 was a specific design of the control gear 6, and the rotary inertial mass was the flywheel 7 with the pins 7b, 7c and 7d. In the embodiment relative to FIG. 2, the rotary inertial mass is a flattened level plate 30 whose plane extends parallel with that of the control gear 6, which in the background is as well indicated schematically. On the control gear 6, forwardly toward the viewer of FIG. 2, extends a gudgeon 6a on which pivots the pawl 10. Located in the same plate as the pawl 10 is also the inertial mass 30, mounted on the gudgeon 6h. The disk shape of the inertial mass 30 relative to FIG. 2 is interrupted by an upper recess 31 and a lower recess 32. Concerned here are oblong recesses which are arranged across a part of the circumference and on diametrically opposite sides relative to the gudgeon 6h. The upper recess 30 is limited by two projections 33 and 34 on which the ends of the pawl 10 can bear. The solid lines indicate the nonpositive condition of equilibrium, the broken lines indicate the pivoted and/or inoperative position. Located opposite the upper recess 31, the recess 32 of similar shape permits a view of the belt-sensitive adjustment spring 11 which was described above and is attached, for one, on the pin of the control gear 6 and, for another, in a hole, an eyelet or similar which in the embodiment relative to FIG. 2 are in comparison with that of FIG. 1 as well marked 36. It can be seen how the pawl 10 lies in the pivoted, or inoperative condition within the circumference of the control gear 6, so that the control gear can freely rotate within the lock/drive disk 5. Now, if due to excessive belt pullout (greater acceleration and speed) the control gear 6 leads the inertial mass 30, the condition indicated by dashed lines will occur, as though the inertial mass 30 as represented in FIG. 2 would turn clockwise relative to the control gear 6. The projection 33 moves then in the direction of the slightly curving arrow in FIG. 2, upper left. With the projection 33 of the inertial mass 30, on the opposite side, moving as well and making room for the movement of the pawl 10, the pawl can move into the position indicated by dashed lines and can initiate the locking process.

It is conceivable that the pawl 10 may be arranged in the same plane as the flywheel 30 before or, alternatively, also behind the control gear 6.

Lastly, FIG. 1 also illustrates the rotary adjustment possibility of the mass force sensor 8, 9 along the axis X—X'. The sensor housing 9 is located in a tongue 21 underneath the lock/drive disk 5 and is held through upper connecting means 20 (front in FIG. 1) and 23 (back). For clarity, the tongue 21 is shown in cut-away view. Die-cast on the sensor housing, below the front upper connecting means 20 is an adjustment pin 22 of smaller design which, depending on vehicle type and thus installation angle of the belt reeling mechanism, may be arranged in various positions and/or angles such, relative to the upper connecting means 20, that for various vheicle types and installation angles one and the same mass force sensor 8, 9 may be used in an inexpensive and simple fashion.

It will be apparent to those skilled in the art that modification and variations can be made in the invention disclosed herein without departing from the scope or spirit of it. Thus, it is intended that the present invention cover such modifications and variations which come within the scope of the appended claims and their equivalents.

What is claimed is:

1. An automatic seat belt reel lock mechanism having a main housing, a reel axle rotatably disposed in said main housing, seat belt webbing wound about the reel axle, a wind spring connected to said housing for producing a torque on the reel axle in the direction to wind said seat belt webbing on said reel axle, a locking ratchet wheel attached to said reel axle and rotatable therewith, a locking pawl having one end pivotally attached to the main housing and movable to engage said ratchet wheel, and a control component having a lock/drive disk concentric with the reel axle and independently rotatable thereabout, a cam attached to the lock/drive disk for actuating said locking pawl to engage the ratchet wheel, a vehicle acceleration device responsive to vehicle accelerations exceeding a first predetermined value for causing the cam to actuate the locking pawl and a rotational acceleration device responsive to the rotational acceleration of the reel axle exceeding a second predetermined value for causing the cam to actuate the locking pawl, wherein said lock/drive disk, has internal gear teeth, said cam disposed on said lock/drive disk being responsive to the rotation of said lock/drive disk in a predetermined direction to actuate said locking pawl to engage said ratchet wheel;

said control component further including a control gear disposed concentric with the reel axle and attached to said ratchet wheel, said control gear having external teeth about its periphery, and a control gear pawl pivotally attached to said control gear;

said rotational acceleration device comprising a rotary inertial mass resiliently connected to said control gear, said inertial mass having means for pivoting said control gear pawl to engage the internal teeth of said lock/drive disk and rotate said lock/drive device with said control gear in said predetermined direction in response to the rotational acceleration of said reel axle exceeding said second predetermined value; and said vehicle acceleration device comprising vehicle acceleration means connected to said lock/drive device for engaging the external teeth of said control gear in response to the vehicle acceleration exceeding said first predetermined value, the engagement of said control gear's external teeth connecting said lock/drive disk to said control gear, thus rotating said lock/drive device in said predetermined direction upon unwinding of said belt for causing said cam to actuate the locking pawl.

2. The automatic lock mechanism of claim 1 wherein said rotary inertial mass has a first pin engaging one end of said control gear pawl to pivot said control gear pawl away from said internal teeth and a second pin engaging the opposite end of said control gear pawl to pivot said control gear pawl into engagement with said internal gear teeth.

3. The automatic lock mechanism of claim 2 wherein said rotary inertial mass is a flat plate parallel with the plane of said control gear and wherein said first and second pins engage said control gear pawl through arcuate slots provided through said control gear.

4. The automatic lock mechanism of claim 1 wherein said control gear has on one side a coaxial first bearing shoulder for rotatably supporting said lock/drive disk and a gudgeon for pivotally supporting said control gear pawl radially displaced from said bearing shoulder, and on the other side, a coaxial second bearing surface for rotatably supporting said rotary inertial mass.

5. The automatic lock mechanism of claim 1 wherein said control cam is a contoured slot provided in a protrusion radially extending from said lock/drive disk and wherein said locking pawl has a control pin protruding therefrom captivated in said contoured slot.

6. The automatic lock mechanism of claim 5 wherein said ratchet wheel and locking pawl have self-meshing teeth.

* * * * *